US010059154B2

(12) United States Patent
Tanno (10) Patent No.: US 10,059,154 B2
(45) Date of Patent: Aug. 28, 2018

(54) TRAVELING DEVICE (75) Inventor: Atsushi Tanno, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 29 days.

(21) Appl. No.: 14/005,790

(22) PCT Filed: Mar. 13, 2012

(86) PCT No.: PCT/JP2012/056441
§ 371 (c)(1),
(2), (4) Date: Sep. 17, 2013

(87) PCT Pub. No.: WO2012/128128
PCT Pub. Date: Sep. 27, 2012

(65) Prior Publication Data
US 2014/0012466 A1  Jan. 9, 2014

(30) Foreign Application Priority Data

Mar. 18, 2011  (JP) .................................. 2011-061125

(51) Int. Cl.
*B60C 23/00*  (2006.01)
(52) U.S. Cl.
CPC .......... *B60C 23/002* (2013.01); *B60C 23/004* (2013.01)
(58) Field of Classification Search
CPC ..... B60C 23/02; B60C 23/04; B60C 23/0408; B60C 23/002; B60C 23/004; B60S 5/046
See application file for complete search history.

(56) References Cited

U.S. PATENT DOCUMENTS

| 6,499,343 | B1 * | 12/2002 | Haas et al. ..................... 73/146 |
| 6,763,292 | B1   | 7/2004  | Smith et al. |
| 6,997,048 | B2 * | 2/2006  | Komatsu ............. B60C 23/0408 |
|           |      |         | 73/146.2 |
| 2001/0030688 | A1 | 10/2001 | Asahi et al. |
| 2005/0194078 | A1 * | 9/2005 | Ogawa .......................... 152/415 |
| 2006/0190212 | A1 * | 8/2006 | Kobetz ......................... 702/138 |
| 2007/0044881 | A1 * | 3/2007 | Skoff ..................... B60C 23/002 |
|              |      |         | 152/416 |
| 2008/0087361 | A1 | 4/2008 | Stommel |

FOREIGN PATENT DOCUMENTS

| DE | 10202993 | 7/2003 |
| DE | 10336330 | 1/2005 |
| DE | 10 2006 048 769 | 4/2008 |
| DE | 102008003845 | 7/2009 |
| JP | H03-104713 | 5/1991 |

(Continued)

OTHER PUBLICATIONS

International Search Report for PCT/JP2012/056441, dated Jun. 12, 2012, 10 pages, Japan.

(Continued)

*Primary Examiner* — Thomas Ingram
(74) *Attorney, Agent, or Firm* — Thorpe North & Western (57) ABSTRACT A traveling device includes a pneumatic tire mounted on a vehicle, an air pressure adjusting device that adjusts air pressure of the pneumatic tire, and an air pressure control device that increases the air pressure to be higher than a recommended inflation pressure when travel speed of the vehicle is not more than a designated speed.

24 Claims, 3 Drawing Sheets (56) References Cited

FOREIGN PATENT DOCUMENTS

| | | |
|---|---|---|
| JP | 03-281405 | 12/1991 |
| JP | 04-189610 | 7/1992 |
| JP | H07-144560 | 6/1995 |
| JP | H10-001036 | 1/1998 |
| JP | 11-115545 | 4/1999 |
| JP | H11-115545 | 4/1999 |
| JP | 2001-180405 | 7/2001 |
| JP | 2001-253219 | 9/2001 |
| JP | 2005-247035 | 9/2005 |
| JP | 2006-062381 | 3/2006 |
| JP | 2006-143132 | 6/2006 |
| JP | 2007-331516 | 12/2007 |
| JP | 2008-006853 | 1/2008 |
| JP | 2008-132836 | 6/2008 |
| JP | 2008-174119 | 7/2008 |
| JP | 2009-143436 | 7/2009 |
| JP | 2009-220616 | 10/2009 |
| KR | 10-0411796 | 12/2002 |
| KR | 10-2004-0001668 | 1/2004 |
| KR | 10-2006-0013138 | 2/2006 |

OTHER PUBLICATIONS

Japan Institute of Invention and Innovation, Journal of Technical Disclosure, Mar. 3, 2008, No. 2008-201554, Japan Institute of Invention and Innovation, Japan.
Japan Institute of Invention and Innovation, Journal of Technical Disclosure, Dec. 1, 2004, No. 2004-507789, Japan Institute of Invention and Innovation, Japan.
Japan Institute of Invention and Innovation, Journal of Technical Disclosure, Mar. 3, 2008, No. 2008-501554, Japan Institute of Invention and Innovation, Japan.

* cited by examiner

TRAVELING DEVICE

TECHNICAL FIELD

The present technology relates to a traveling device that changes air pressure of a pneumatic tire according to a driving condition of a vehicle.

BACKGROUND

In recent years, a technology that improves driving performance of a vehicle by a mechanism that changes air pressure of a pneumatic tire has been proposed (see Japanese Unexamined Patent Application Publication Nos. 2009-143436, 2007-331516 and 2006-062381).

SUMMARY

In light of recent demand to suppress energy consumption in vehicles for reducing environmental burden, the present technology suppresses energy consumption in vehicles that have a function to adjust air pressure in a pneumatic tire.

The present technology is a traveling device that includes a pneumatic tire mounted on a vehicle, an air pressure adjusting device that adjusts air pressure of the pneumatic tire, and an air pressure control device that increases the air pressure to be higher than a recommended inflation pressure when a travel speed of the vehicle is not more than a designated speed.

As a favorable mode of the present technology, the air pressure control device preferably makes the air pressure to be higher than the recommended inflation pressure when the vehicle is accelerating.

As a favorable mode of the present technology, the air pressure control device preferably makes the air pressure to be equal to the recommended inflation pressure when the vehicle is braking.

As a favorable mode of the present technology, the air pressure control device preferably makes the air pressure to be equal to the recommended inflation pressure when the vehicle is turning or an electronic stability control system for the vehicle is activated.

As a favorable mode of the present technology, the air pressure control device preferably makes the air pressure to be equal to the recommended inflation pressure when a distance from the vehicle to a vehicle that drives ahead of the vehicle is not more than a designated value.

As a favorable mode of the present technology, the air pressure control device preferably changes the air pressure based on road conditions.

As a favorable mode of the present technology, the air pressure control device preferably makes the air pressure to be higher than the recommended inflation pressure when detecting that the vehicle is parked.

As a favorable mode of the present technology, the air pressure control device preferably has a means that can change air pressure by manual operation.

As a favorable mode of the present technology, the air pressure control device preferably makes the air pressure to be higher than the recommended inflation pressure when a traveling speed of the vehicle is greater than a designated speed and when the vehicle is advancing forward at a constant speed.

The present technology can suppress energy consumption in a vehicle having a function to adjust air pressure of a pneumatic tire.

DETAILED DESCRIPTION

A form of the present technology (embodiment) is described below in detail while referring to the drawings. However, the present technology is not limited to the descriptions given in the embodiment. Additionally, the constituents described below include those constituents that could be easily conceived by a person skilled in the art, and constituents that are essentially identical to those described herein. Furthermore, it is possible to combine the constituents described below as desired.

Figure 1:
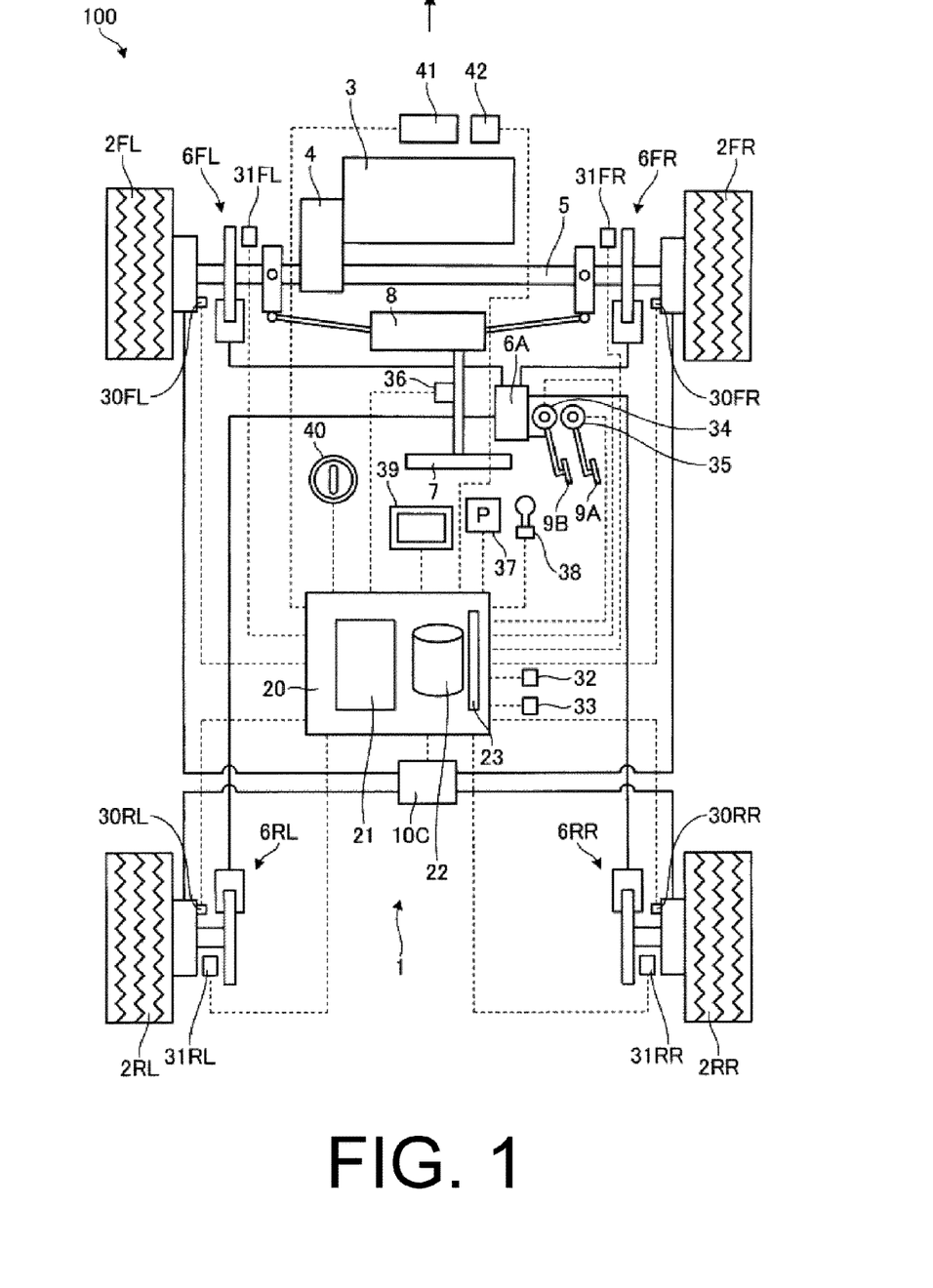
FIG. 1 is a schematic view illustrating an example of a vehicle provided with a traveling device according to this embodiment.

FIG. 1 is a schematic view illustrating an example of a vehicle provided with a traveling device according to this embodiment. In FIG. 1, a vehicle 100 is advancing in a direction of arrow X of FIG. 1. The direction that the vehicle 100 is advancing is a direction that a driver of the vehicle 100 is pointing a steering wheel 7 from the driver's seat. The distinction between left and right is referenced by the direction that the vehicle 100 is advancing (direction arrow X in FIG. 1). In other words, "left" means the left side facing the direction that the vehicle 100 is advancing, and "right" means the right side facing the direction that the vehicle 100 is advancing. Further, for front and back of the vehicle 100, front is the direction when the vehicle 100 is advancing forward, and back is the direction when the vehicle 100 is reversing, which is to say, a direction that is opposite of when the vehicle 100 is advancing forward. Furthermore, "down" means the direction of gravitational force and "up" means the opposite side from the direction of gravitational force.

First, a description will be given of an overall configuration of the vehicle 100. The vehicle 100 is provided with a traveling device 1, four wheels that include a front left wheel 2FL, a front right wheel 2FR, a rear left wheel 2RL, and a rear right wheel 2RR, and an internal combustion engine 3. The vehicle 100 uses the internal combustion engine 3 as a power generating means. In this embodiment, the internal combustion engine 3 is installed in the forward in the traveling direction (in the direction of the arrow X in FIG. 1) of the vehicle 100. The power generated by the internal combustion engine 3 is first input into a transmission 4, then transferred to the front left wheel 2FL and the front right wheel 2FR that are the driving wheels via a drive shaft 5. Accordingly, the vehicle 100 travels. Note that, in this embodiment, there is no restriction to a type of internal combustion engine 3. Further, the installation position of the internal combustion engine 3 into the vehicle 100 is not limited to the description given in this embodiment.

Furthermore, the power generating means of the vehicle 100 is not limited to the internal combustion engine. For example, a power generating means of a so-called hybrid system where an internal combustion engine and an electric motor are combined may be provided, or only an electric motor may be provided as the power generating means. When only the electric motor is used as the power generating means, the so-called in-wheel type motor system where an electric motor is provided for each wheel respectively may be used. Moreover, the transmission 4 may be provided with a so-called driving force distribution function which is a function that can change driving force of the front left wheel 2FL and the driving force of the front right wheel 2FR.

The front left wheel 2FL and the front right wheel 2FR of the vehicle 100 function as the driving wheels of the vehicle 100 and also as the steering wheels of the vehicle 100. Further, the rear left wheel 2RL and the rear right wheel 2RR are coupled driving wheels of the vehicle 100. In this manner, the vehicle 100 adopts a so-called front engine front drive (FF) system. Note that, the drive system of the vehicle 100 is not limited to the FF system, but a so-called front engine rear drive (FR) system, or a 4 wheel drive (4 WD) system may be used. Furthermore, the vehicle 100 may be provided with a drive system that can control the turning performance of the vehicle 100 or improve the travel stability of the vehicle 100 by changing the driving force of each driving wheel.

In the vehicle 100, an operation of the steering wheel 7 by the driver is transferred to the front left wheel 2FL and the front right wheel 2FR via a steering gear box 8. In this manner, the front left wheel 2FL and the front right wheel 2FR are steered. The front left wheel 2FL, the front right wheel 2FR, the rear left wheel 2RL, and the rear right wheel 2RR are provided with braking devices 6FL, 6FR, 6RL, and 6RR, respectively. Each of the braking devices 6FL, 6FR, 6RL, and 6RR is connected to a brake actuator 6A by a brake pipe. The brake actuator 6A transfers the input generated by the pressing of brake pedal 9B by the driver of the vehicle 100 to the braking devices 6FL, 6FR, 6RL, and 6RR via brake oil within the brake pipes. Then, the braking devices 6FL, 6FR, 6RL, and 6RR generate a braking force to the front left wheel 2FL, the front right wheel 2FR, the rear left wheel 2RL, and the rear right wheel 2RR by the transferred input.

The traveling device 1 includes pneumatic tires mounted on the vehicle 100, which is to say, a front left wheel 2FL, a front right wheel 2FR, and a rear left wheel 2RL, and a rear right wheel 2RR, a control unit 10C of the air pressure adjusting device, and an air pressure control device 20. The air pressure adjusting device includes the control unit 10C and adjusts air pressure of the pneumatic tires. A description of the air pressure adjusting device will be given hereinafter. The air pressure control device 20 changes air pressure of the pneumatic tires based on speed, acceleration, presence or absence of turning, and other travel conditions of the vehicle 100. The air pressure control device 20 has, for example, a processing unit 21, memory unit 22, and an input/output unit 23.

The processing unit 21 is, for example, a central processing unit (CPU), and the memory unit 22 is a combination of, for example, random access memory (RAM), read only memory (ROM), and the like. The processing unit 21 carries out travel control of this embodiment according to a computer program and data that are stored in the memory unit 22 in order to realize travel control of this embodiment. The memory unit 22 stores the computer program and data in order to realize travel control of this embodiment. The input/output unit 23 is connected to various sensors, to obtain travel conditions of the vehicle 100, and to the control unit 10C of the air pressure adjusting device. The travel conditions are acquired by the processing unit 21 and the memory unit 22 via the input/output unit 23. The processing unit 21 sends control signals to the control unit 10C of the air pressure adjusting device for controlling the operation of the control unit 10C of the air pressure adjusting device via the input/output unit 23.

Various sensors to acquire travel conditions of the vehicle 100 include wheel rotation speed sensors 31FL, 31FR, 31RL, and 31RR, a vehicle speed sensor 32, an acceleration sensor 33, a brake sensor 34, an acceleration position sensor 35, a steering angle sensor 36, a parking sensor 37, an ignition switch 38, a car navigation device 39, a travel direction information detecting sensor 41, and a road condition detecting sensor 42. The wheel rotation speed sensors 31FL, 31FR, 31RL, and 31RR detect rotation speed of the front left wheel 2FL, the front right wheel 2FR, the rear left wheel 2RL, and the rear right wheel 2RR. The vehicle speed sensor 32 detects a traveling speed (vehicle speed) of the vehicle 100. The acceleration sensor 33 detects the acceleration of the vehicle 100 (acceleration of the front-back direction and acceleration of a lateral direction that is the direction orthogonal to the front-back direction). The acceleration sensor 33 detects whether the vehicle 100 is accelerating or decelerating, whether or not the vehicle is turning, or the like. The brake sensor 34 detects an operation amount for the brake pedal 9B. The acceleration position sensor 35 detects an operation amount for the accelerator pedal 9A. The steering angle sensor 36 detects a steering angle of the steering wheels that are the front left wheel 2FL and the front right wheel 2FR from the operation amount for the steering wheel 7. The parking sensor 37 detects when a parking brake (side brake) of the vehicle 100 is operated, which is to say, the vehicle 100 is parked. The ignition switch 38 is a switch in order to start the internal combustion engine 3 of the vehicle 100. When the ignition switch 38 is turned on, the vehicle 100 is in a state of operation. The car navigation device 39 is a device to measure a position of the vehicle 100 by using a global positioning system (GPS), and detects positional information of the vehicle 100. The traveling direction information detecting sensor 41 detects information in the forward in the traveling direction of the vehicle 100. For example, a camera, millimeter-wave radar, laser radar, or the like may be used for the traveling direction information detecting sensor 41. The road condition detecting sensor 42 detects information on road conditions in the forward in the traveling direction of the vehicle 100. For example, it detects information such as whether the road surface is wet, covered with snow, dry, or the like. Such as a camera, millimeter-wave radar, or the like may be used for the road condition detecting sensor 42.

Pressure sensors 30FL, 30FR, 30RL, and 30RR that detect air pressure of pneumatic tires installed respectively on the front left wheel 2FL, the front right wheel 2FR, the rear left wheel 2RL, and the rear right wheel 2RR are connected to the input/output unit 23 of the air pressure control device 20. The air pressure control device 20 controls the control unit 10C of the air pressure adjusting device based on air pressure of the front left wheel 2FL, the right front wheel 2FR, the rear left wheel 2RL and the rear right wheel 2RR detected by the pressure sensors 30FL, 30FR, 30RL, and 30RR so that each pneumatic tire becomes a target air pressure. An air pressure adjusting switch 40 for manual operation is connected to the input/output unit 23 of the air pressure control device 20. The air pressure adjusting switch 40 is a switch to change air pressure of the pneumatic tires by manual operation by the driver. The air pressure control device 20 that has received an input from the air pressure adjusting switch 40 supplies air to pneumatic tires or discharges air from pneumatic tires by activating the air pressure adjusting device and also acquires signals detected by the pressure sensors 30FL, 30FR, 30RL, and 30RR. Subsequently, the air pressure control device 20 gives feedback and controls the air pressure control device so that the air pressure of each of the pneumatic tires becomes the air pressure input from the air pressure adjusting switch 40. Next, a description of the air pressure adjusting device will be given in detail.

Figure 2:
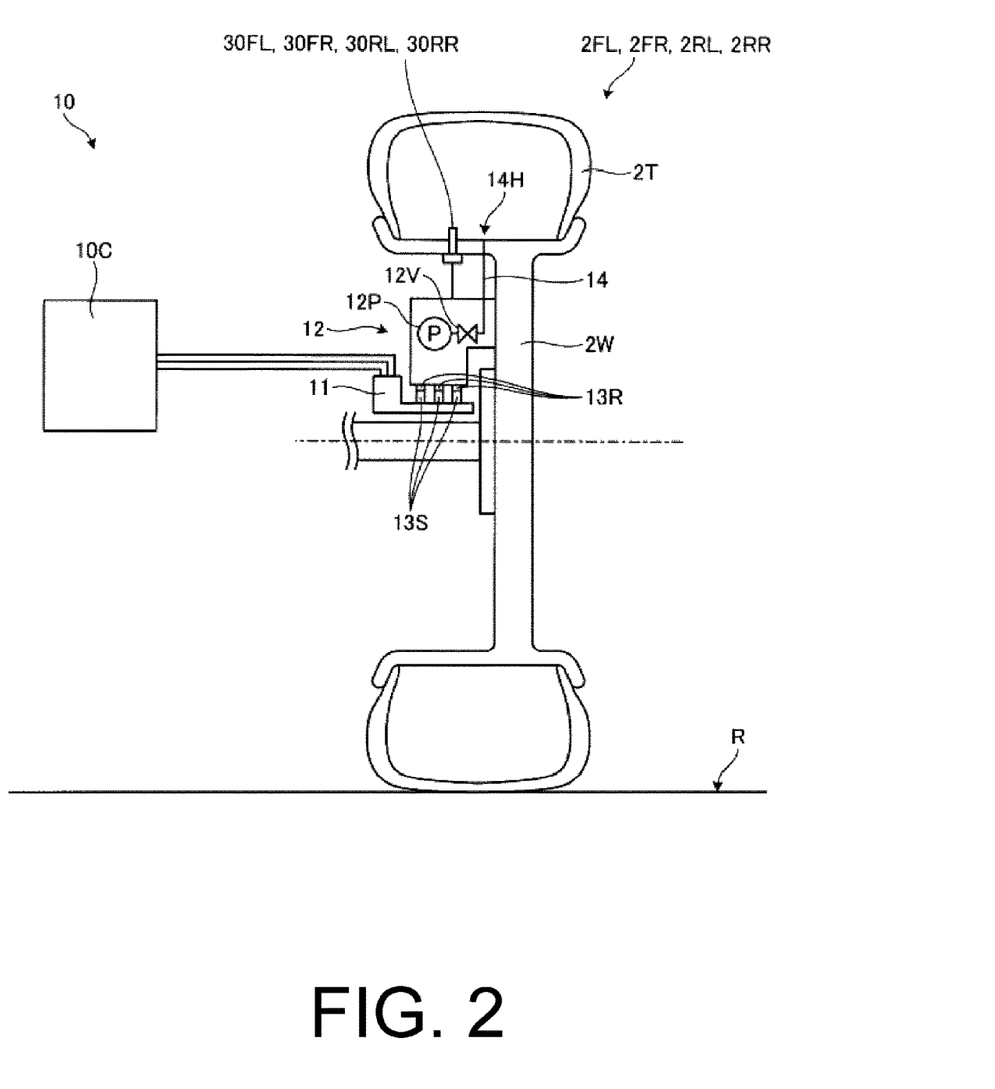
FIG. 2 is an explanatory view illustrating an air pressure adjusting device in the traveling device according to this embodiment.

FIG. 2 is an explanatory view illustrating the air pressure adjusting device in the traveling device according to this embodiment. In this embodiment, an air pressure control device 10 includes the control unit 10C, a pressurizing and depressurizing unit 12, and pressure sensors 30FL, 30FR, 30RL, and 30RR. The pressurizing and depressurizing unit 12 includes a pressure pump 12P, a valve assembly 12V, pneumatic piping 14, and a plurality of rotation side terminals 13R. The pressurizing and depressurizing unit 12 is mounted on the wheel 2W and rotates together with the front left wheel 2FL, front right wheel 2FR, rear left wheel 2RL, and rear right wheel 2RR. The control unit 10C is connected to a plurality of static side terminals 13S provided in the terminal 13 mounted on the vehicle body of the vehicle 100 illustrated in FIG. 1. In this embodiment, the plurality of static side terminals 13S are circular conductors. Each of the rotation side terminals 13R and static side terminals 13S contact each other, and electrical power and electrical signals are transferred therebetween. When the pressurizing and depressurizing unit 12 rotates with the pneumatic tire 2T and the wheel 2W, the electrical power and electrical signals are exchanged between the static side terminals 13S and the rotation side terminals 13R while each of the rotation side terminals 13R is sliding around the circumference of each of the static side terminal 13S. In this manner, the air pressure adjusting device 10 exchanges electrical power and electrical signals between the static system and the rotating system by a slip ring configured with the static side terminals 13S and the rotation side terminals 13R.

The control unit 10C supplies electrical power and control signals to the pump 12P and valve assembly 12V via the static side terminals 13S and the rotation side terminals 13R. Accordingly, the control unit 10C installed on the body of the vehicle 100 which is the static system, controls the operation of the pressure pump 12P and the valve assembly 12V by supplying electrical power and control signals to the pressurizing and depressurizing unit 12 that is installed on the rotating system. Further, signals from the pressure sensors 30FL, 30FR, 30RL, and 30RR are retrieved from the rotating system to the static system via the rotation side terminals 13R and the static side terminals 13S, and are acquired by the air pressure control device 20 mounted on the body of the vehicle 100 which is the static system.

The pneumatic tire 2T is assembled on the wheel 2W for the front left wheel 2FL, the front right wheel 2FR, the rear left wheel 2RL, and the rear right wheel 2RR. The pneumatic tire contacts the road surface R. Air is filled in the space enclosed by a rim of the wheel 2W and the pneumatic tire 2T. The pneumatic piping 14 of the pressurizing and depressurizing unit 12 has a first end portion connected to the valve assembly 12V, and a second end portion opened to the space. The pressure sensors 30FL, 30DR, 30RL, and 30RR described above have a pressure detecting unit disposed in the space that detects the air pressure filled within the space. When increasing the air pressure of the pneumatic tire 2T, the control unit 10C of the air pressure adjusting device 10 opens the valve assembly 12V as well as drives the pressure pump 12P to supply air into the pneumatic tire 2T. When the air pressure reaches the target value, the control unit 10C closes the valve assembly 12V as well as stops the pressure pump 12P. When reducing the air pressure of the pneumatic tire 2T, the control unit 10C of the air pressure adjusting device 10 opens the valve assembly 12V to release air from the pneumatic tire 2T. When the air pressure reaches the target value, the control unit 10C closes the valve assembly 12V. Note that, the control unit 10C is controlled by the air pressure control device 20 described above. In this manner, the air pressure adjusting device 10 can increase and decrease the air pressure of the pneumatic tire 2T. Note that, the air pressure adjusting device 10 is an example and is not limited to such configuration. For example, the air may be circulated between the static system and the rotating system by using a hub having a sealing material in a rotating unit. Next, a description of an example of travel control by the traveling device 1 will be given.

Figure 3:
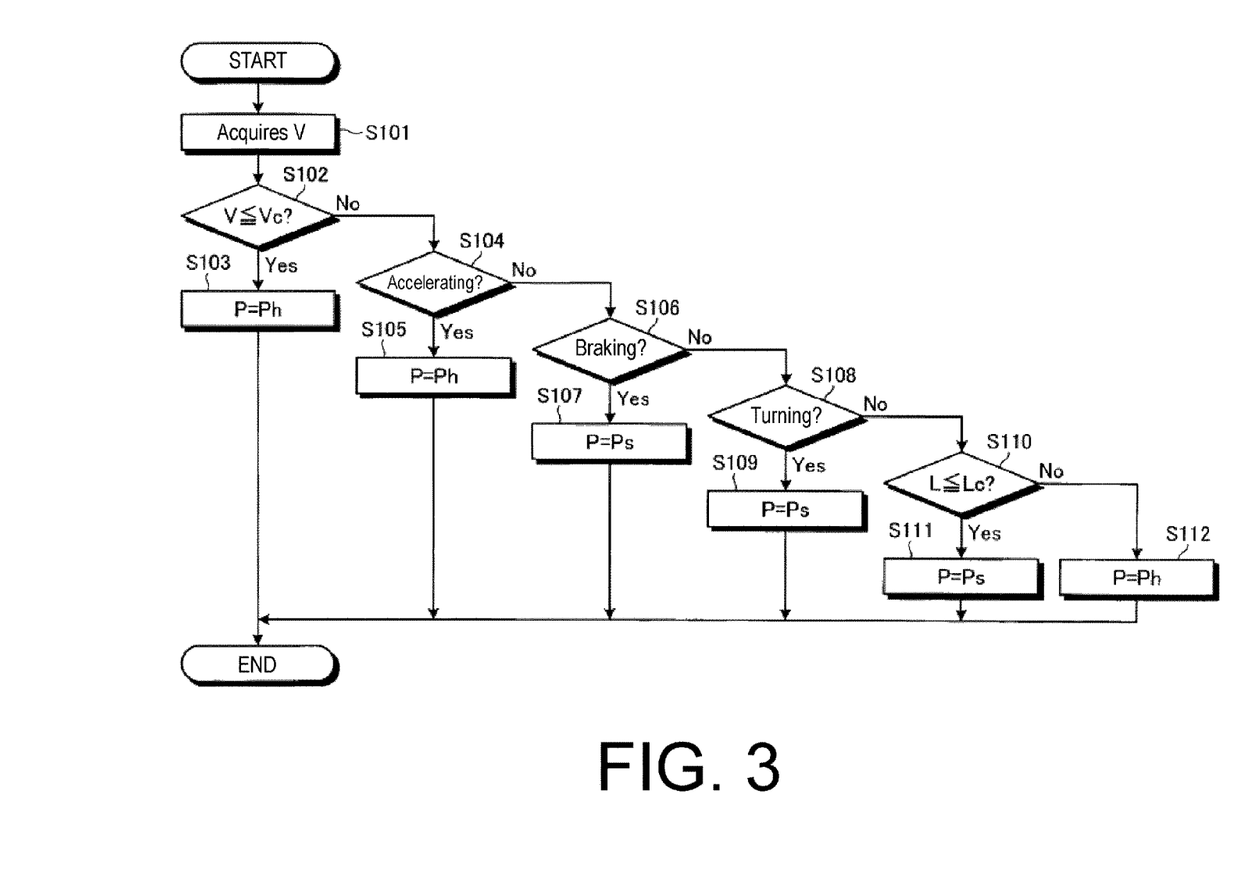
FIG. 3 is a flowchart illustrating an example of travel control by the traveling device according to this embodiment.

FIG. 3 is a flowchart illustrating an example of travel control by the traveling device according to this embodiment. First, in step S101, a processing unit 21 of the air pressure control device 20 of the traveling device 1 illustrated in FIG. 1 acquires a vehicle speed V of the vehicle 100 from a vehicle speed sensor 32. Next, it proceeds to step S102, and the processing unit 21 compares the acquired vehicle speed V to a predetermined vehicle speed threshold value Vc. The vehicle speed threshold value Vc is stored in a memory unit 22. When V is not greater than Vc (Yes in step S102), it proceeds to step S103, and the processing unit 21 makes the air pressure P to be Ph. Ph is a value higher than the recommended inflation pressure Ps of the vehicle 100 where a pneumatic tire 2T is mounted. The recommended inflation pressure Ps is a designated air pressure set for each vehicle 100. The recommended inflation pressure Ps differs according to each vehicle 100; however, it is for example, from 210 kPa to 260 kPa, or from 230 kPa to 290 kPa. Ph is preferably not less than 50 kPa higher than the recommended inflation pressure Ps, and not less than 80 kPa higher is more preferred.

The travel control of this embodiment improves travel performance and suppresses fuel consumption of the vehicle 100 by adjusting air pressure of the pneumatic tire 2T according to the travel conditions of the vehicle 100. However, when the vehicle 100 is traveling at low speed, there is no significant change in braking performance and turning performance even if the air pressure is changed. Therefore, in the travel control according to this embodiment, the air pressure control device 20 increases the air pressure P to be higher than the recommended inflation pressure to lower rolling resistance of the pneumatic tire 2T when the vehicle speed V is lower than the vehicle speed threshold value Vc. This allows suppressing fuel consumption and electricity consumption of the vehicle 100. That is to say, the energy consumption of the vehicle 100 can be suppressed. The vehicle speed threshold value Vc is an upper limit of the speed where there is a small change in the braking performance and turning performance even when the air pressure is changed, for example, it is preferred to be not less than 30 km/h and not more than 40 km/h. Note that, the air pressure P may not be adjusted so as to be the same for all of the front left wheel 2FL, front right wheel 2FR, rear left wheel 2RL, and rear right wheel 2RR, and the air pressure P may be different, for example, for the front and back wheels.

In step S102, when V is greater than Vc (No in step S102), the travel control according to this embodiment proceeds to step S104. In step S104, when the vehicle 100 is accelerating (Yes in step S104), the processing unit 21 proceeds to step S105 and makes the air pressure P to be Ph. For example, when an acceleration of the vehicle 100 acquired from an acceleration sensor 33 is a positive threshold or above (for example, 1.0 m/s² or above) in the front-back direction, the processing unit 21 executes processing in step S105 as the vehicle 100 is accelerating. This case also does not need to have the same air pressure in the front and back wheels. Further, when an acceleration position sensor 35 detects operation of the accelerator pedal 9A of a predetermined amount or more as well as a predetermined speed or higher, the processing unit 21 may execute the processing of step S105 as the vehicle 100 is accelerating. Particularly, when accelerating, the smaller the rolling resistance of the pneumatic tire 2T, fuel consumption of the vehicle 100 can be better suppressed. Therefore, in this embodiment, it is preferred when the vehicle 100 is accelerating that a higher air pressure P of the pneumatic tire 2T reduces the rolling resistance of the pneumatic tire 2T to thereby suppress fuel consumption of the vehicle 100. In step S104, when the vehicle 100 is not accelerating (No in step S104), the processing unit 21 proceeds to step S106.

In step S106, when the vehicle 100 is braking (Yes in step S106), the processing unit 21 proceeds to step S107 and makes the air pressure P to be Ps. For example, when an acceleration of the vehicle 100 acquired from the acceleration sensor 33 is a negative threshold or less (for example, −1.0 m/s² or less) in the front-back direction, or a rate of acceleration change of the vehicle 100 is a negative threshold or less (for example, −0.50 m/s³ or less) in the front-back direction, the processing unit 21 executes the processing in step S105 as the vehicle 100 is braking. Further, when brake sensor 34 detects operation of the brake pedal 9B, the processing unit 21 may execute the processing of step S107 as the vehicle 100 is braking. When the vehicle 100 is braking, the air pressure P is made to be the recommended inflation pressure Ps during a braking event because the braking performance goes down when air pressure P of the pneumatic tire 2T is high. Accordingly, the braking performance of the vehicle 100 can be ensured, and the braking distance can be suppressed so as to be not as long. Note that, the air pressure P may be smaller than the recommended inflation pressure Ps during braking. Further, the air pressure P may not be adjusted so as to be the same in all of the front left wheel 2FL, front right wheel 2FR, rear left wheel 2RL, and rear right wheel 2RR, and the air pressure P may be different, for example, for the front and back wheels. In step S106, when the vehicle 100 is not braking (No in step S106), the processing unit 21 proceeds to step S108.

In step S108, when the vehicle 100 is turning (Yes in step S108), the processing unit 21 proceeds to step S109 and makes the air pressure P to be Ps. For example, when a steering angle sensor 36 detects steering of the steering wheels of the vehicle 100 or the acceleration sensor 33 detects lateral acceleration (for example, 1.0 m/s² or above) of at least a designated value, the processing unit 21 executes the processing of step S109 as the vehicle 100 is turning, that is to say, the air pressure P is made to be Ps. When the vehicle 100 is turning, the air pressure P is made to be the recommended inflation pressure Ps because grip strength of the pneumatic tire 2T drops and turning performance goes down when the air pressure P of the pneumatic tire 2T is excessively high. Accordingly, the grip strength of the pneumatic tire 2T can be ensured, and the turning performance of the vehicle 100 can be ensured. Note that, the air pressure P may be smaller than the recommended inflation pressure Ps during turning.

Further, the air pressure P may not be adjusted so as to be the same in all of the front left wheel 2FL, front right wheel 2FR, rear left wheel 2RL, and rear right wheel 2RR, and the air pressure P may be different, for example, for the right and left wheels. Furthermore, the steering angle and the air pressure P may be linked and operated together so as to be changed. When the steering angle is greater, the greater grip strength is required; however, by reducing the air pressure P as the steering angle becomes greater, greater grip strength can be generated to the pneumatic tire 2T according to the steering angle. Moreover, the air pressure P may be changed simultaneously with the damping force of the suspension of the vehicle 100. In this manner, steering stability and riding comfort can be improved.

In step S108, if the vehicle 100 is provided with an electronic stability control system, the processing unit 21 may execute the processing in step S109 when the electronic stability control system is activated, in other words, the air pressure P may be made to be Ps. The electronic stability control system is activated in order to resolve the sideslip that occurs when the vehicle 100 is turning, and at that time, there is a risk in which the grip strength of the pneumatic tire 2T drops and the sideslip cannot be resolved quickly when the air pressure P of the pneumatic tire 2T is excessively high. Therefore, when the electronic stability control system is activated, the processing unit 21 can ensure the grip strength of the pneumatic tire 2T and resolve the sideslip of the vehicle 100 quickly by making P=Ps. Note that, when the electronic stability control system is activated, the air pressure P may be smaller than the recommended inflation pressure Ps. In step S108, when the vehicle 100 is not turning (No in step S108), the processing unit 21 proceeds to step S110.

In step S110, when a distance L between two vehicles for the vehicle 100 and a vehicle that drives ahead of the vehicle 100, is the predetermined threshold distance Lc or less between two vehicles (Yes in step S110), the processing unit 21 proceeds to step S111 and makes the air pressure P to be Ps. For example, the processing unit 21 acquires the distance L between two vehicles from the vehicle that drives ahead detected by the traveling direction information detecting sensor 41 and compares this to the threshold distance Lc between two vehicles that has been stored in the memory unit 22. As a result, when L is Lc or less, the processing unit 21 makes the air pressure P of the pneumatic tire 2T to be Ps. When the vehicle 100 and the vehicle ahead move closer, the distance L between two vehicles becomes smaller. When this happens, the driver of the vehicle 100 applies the brake of the vehicle 100 so that the distance L between two vehicles is not shorter than that of the present time. The threshold distance Lc between two vehicles is set to a distance where the driver of the vehicle 100 is expected to start applying the brake due to a short distance between the vehicle 100 and the vehicle ahead. Further, the speed in which vehicle 100 becomes closer to the vehicle ahead changes according to the speed V of the vehicle 100, and therefore, the threshold distance Lc between two vehicles may be a function of the speed V.

In addition, a travel control device that detects a traveling environment in front of the vehicle 100 by an onboard camera, laser radar, or the like, and sets a target reduced speed for the vehicle itself to travel while maintaining a constant distance to the vehicle ahead or an obstacle has been put to practical use. By operating this type of device at the same time, the air pressure P may even be reduced from Ph to be closer in line with Ps according to at least one of either the relative velocity with respect to the obstacle or the change in the distance from the vehicle ahead.

When the distance L between two vehicles is Lc or less, there is a high possibility that the driver of the vehicle 100 will apply the brake. Therefore, the processing unit 21 prepares so that the vehicle 100 can fulfill the braking performance by making the air pressure P to be Ps in step S111. In this manner, when the driver of the vehicle 100 applies the brake to the vehicle 100, the vehicle 100 can demonstrate the braking performance fully, and safety is improved. Note that, when operation of the accelerator pedal 9A is released, the processing unit 21 may make the air pressure P to be Ps in step S111. Further, the air pressure P may be made to be smaller than the recommended inflation pressure Ps in step S111. Furthermore, the air pressure P may not be adjusted so as to be the same in all of the front left wheel 2FL, front right wheel 2FR, rear left wheel 2RL, and rear right wheel 2RR, and the air pressure P may be different, for example, for the front and back wheels. In step S110, when the distance L between two vehicles is greater than the threshold distance Lc between two vehicles (No in step S110), it proceeds to S112.

When steps S102, S104, S106, S108, and S110 are all determined to be "No", the vehicle 100 is advancing forward at a constant speed higher than the vehicle speed threshold value Vc. In this case, the processing unit 21 makes the air pressure P of the pneumatic tire 2T to be Ph in step S112. This allows suppressing fuel consumption and electricity consumption of the vehicle 100 because the rolling resistance of the pneumatic tire 2T can be reduced. Note that, the air pressure P may not be adjusted so as to be the same for all of the front left wheel 2FL, front right wheel 2FR, rear left wheel 2RL, and rear right wheel 2RR, and the air pressure P may be different, for example, for the front and back wheels.

This embodiment fundamentally considers the air pressure P of the pneumatic tire 2T to be Ps; however, when the vehicle speed V is not more than the vehicle speed threshold value Vc, the air pressure P of the pneumatic tire 2T is made to be Ph uniformly. Further, when the vehicle speed V is greater than the vehicle speed threshold value Vc, the air pressure P is made to be Ph if the vehicle 100 is advancing forward at the constant speed, and besides this, the air pressure P is switched to Ph or Ps according to the travel conditions. In this manner, the fuel consumption or electricity consumption of the vehicle 100 can be suppressed, and when applying the brakes or the like, the grip of the pneumatic tire 2T can be secured to ensure driving stability.

Further, when the driver of the vehicle 100 selects the reversing gear, the processing unit 21 makes the air pressure P of the pneumatic tire 2T to be Ph. Parking the vehicle into a garage is considered in such case, and by having the air pressure P=Ph, the steering load in stationary steering can be reduced. Therefore, when the vehicle 100 is provided with a power steering device, load of the power steering device can be reduced so that the energy consumption can be suppressed. Furthermore, even the durability deterioration of the power steering device can be suppressed.

The processing unit 21 of the air pressure control device 20 may change the air pressure P of the pneumatic tire 2T according to the road surface condition (road condition) in the forward in the travel direction of the vehicle 100. With the vehicle 100, the braking distance or the turning performance changes according to friction between the road surface and the pneumatic tire 2T. The friction changes according to road condition. For example, when the road surface is wet, the friction is smaller compared to a dry road surface. Therefore, the processing unit 21 ensures braking performance or turning performance of the vehicle 100 by changing the air pressure P based on the road condition.

For example, when the road surface is wet, the air pressure P is increased by from 30 kPa to 50 kPa compared to a dry road surface. In this manner, the braking performance can be ensured by making the ground contact area between the pneumatic tire 2T and the road surface smaller to increase surface pressure, thereby ensuring the braking performance of the vehicle 100. Further, when the road is covered with snow, the air pressure P is lowered compared to a case where the road surface is dry. Accordingly, the travel stability of the vehicle 100 on the snow can be ensured.

The road condition is detected by a road condition detecting sensor 42 of the vehicle 100. The road condition detecting sensor 42 sends, for example, light, electromagnetic waves, or sound waves onto the road surface and detects the road condition with the reflectance, in other words, whether if the road surface is dry or wet. Further, the processing unit 21 may detect the road condition based on an anti-lock brake system (ABS) sensor of the vehicle 100. In this case, the ABS sensor is a means for detecting the road condition. The ABS sensor can utilize, for example, wheel rotation speed sensors 31FL, 31FR, 31RL, and 31RR. The ABS is a device for control so that the wheels of the vehicle 100 are not locked; however, when the friction between the pneumatic tire 2T and the road surface is lowered, the ABS is often activated. The ABS is activated by information from the ABS sensor, and therefore, by using the information from the ABS sensor, the road condition can be received indirectly and the lowering of friction can be known.

Further, the processing unit 21 may detect the road condition (whether or not the road surface is wet) by using a raindrop sensor that is associated with a windshield wiper of the vehicle 100. Furthermore, the processing unit 21 may receive weather information of an area where the vehicle 100 is traveling and detect the road condition based on the weather information by using a communication function installed in the vehicle 100. Moreover, a changing-over switch that changes the air pressure P when selecting the road condition may be installed in the vehicle 100, and the driver of the vehicle 100 may change the air pressure P by operating the change-over switch.

When the processing unit 21 of the air pressure control device 20 detects that the vehicle 100 is parking, the air pressure P of the pneumatic tire 2T may be the air pressure Ph that is higher than the recommended inflation pressure. The processing unit 21 changes the air pressure P to be Ph when the parking sensor 37 has detected that the vehicle 100 is parked. In this manner, creating a flat spot can be suppressed. The parking sensor 37 can use, for example, a sensor that detects an operation of the side brake of the vehicle 100, or a shift mode selector of an AT vehicle.

As described above, the vehicle 100 is provided with an air pressure adjusting switch 40. The air pressure adjusting switch 40 is a means for changing the air pressure P by manual operation. By the air pressure adjusting switch 40, the driver of the vehicle 100 can adjust the air pressure P by the driver's own judgment, and therefore, degree of freedom of operation can be improved.

What is claimed is:
1. A traveling device, comprising:
a pneumatic tire mounted on a vehicle;
an air pressure adjusting device that includes a control unit, and adjusts air pressure of the pneumatic tire; and
an air pressure control device that includes a processing unit, a memory unit, and an input/output unit, and increases the air pressure to be higher than a recommended inflation pressure when travel speed of the vehicle is not more than a designated speed, wherein the air pressure control device makes the air pressure to be equal to the recommended inflation pressure when a distance between the vehicle and a vehicle that drives ahead of the vehicle is not more than a designated value, and the recommended inflation pressure is a designated air pressure set for each vehicle, a low pressure is less than the recommended inflation pressure and a high pressure greater than the recommended inflation pressure to limit a range of the air pressure.

2. The traveling device according to claim 1, wherein the air pressure control device makes the air pressure to be equal to the recommended inflation pressure when the vehicle is turning or an electronic stability control system of the vehicle is activated.

3. The traveling device according to claim 2, wherein the air pressure control device increases the air pressure to be higher than the recommended inflation pressure when travel speed of the vehicle is greater than a designated speed and when the vehicle is advancing forward at a constant speed.

4. The traveling device according to claim 1, wherein the air pressure control device changes the air pressure based on road conditions.

5. The traveling device according to claim 4, wherein the air pressure control device increases the air pressure to be higher than the recommended inflation pressure when travel speed of the vehicle is greater than a designated speed and when the vehicle is advancing forward at a constant speed.

6. The traveling device according to claim 1, wherein the air pressure control device increases the air pressure to be higher than the recommended inflation pressure when the vehicle is parked.

7. The traveling device according to claim 6, wherein the air pressure control device increases the air pressure to be higher than the recommended inflation pressure when travel speed of the vehicle is greater than a designated speed and when the vehicle is advancing forward at a constant speed.

8. The traveling device according to claim 1, wherein the air pressure control device has an air pressure adjusting switch that can change air pressure by manual operation.

9. The traveling device according to claim 8, wherein the air pressure control device increases the air pressure to be higher than the recommended inflation pressure when travel speed of the vehicle is greater than a designated speed and when the vehicle is advancing forward at a constant speed.

10. The traveling device according to claim 1, wherein the air pressure control device increases the air pressure to be higher than the recommended inflation pressure when travel speed of the vehicle is greater than a designated speed and when the vehicle is advancing forward at a constant speed.

11. The traveling device according to claim 1, wherein the air pressure control device increases the air pressure to be not less than 50 kPa higher than the recommended inflation pressure when the travel speed of the vehicle is not more than the designated speed.

12. The traveling device according to claim 1, wherein the air pressure control device increases the air pressure to be not less than 80 kPa higher than the recommended inflation pressure when the travel speed of the vehicle is not more than the designated speed.

13. The traveling device according to claim 1, wherein the designated speed is at least 30 km/h.

14. The traveling device according to claim 13, wherein the designated speed is less than or equal to 40 km/h.

15. A traveling device, comprising:
a pneumatic tire mounted on a vehicle;
an air pressure adjusting device that includes a control unit, and adjusts air pressure of the pneumatic tire; and
an air pressure control device that includes a processing unit, a memory unit, and an input/output unit, and increases the air pressure to be higher than a recommended inflation pressure when travel speed of the vehicle is not more than a designated speed, wherein
the air pressure control device makes the air pressure to be equal to the recommended inflation pressure when a distance between the vehicle and a vehicle that drives ahead of the vehicle is not more than a designated value,
the recommended inflation pressure is a designated air pressure set for each vehicle, a low pressure is less than the recommended inflation pressure and a high pressure is greater than the recommended inflation pressure to limit a range of the air pressure,
the air pressure control device increases the air pressure to be higher than the recommended inflation pressure when the vehicle is accelerating, and
the air pressure control device makes the air pressure to be equal to the recommended inflation pressure when the vehicle is braking.

16. The traveling device according to claim 15, wherein the air pressure control device increases the air pressure to be higher than the recommended inflation pressure when travel speed of the vehicle is greater than a designated speed and when the vehicle is advancing forward at a constant speed.

17. The traveling device according to claim 15, wherein the air pressure control device makes the air pressure to be equal to or lower than the recommended inflation pressure when the vehicle is turning.

18. A traveling device, comprising:
pneumatic tires mounted on a vehicle;
an air pressure adjusting device that includes a control unit, and adjusts air pressure of the pneumatic tires; and
an air pressure control device that includes a processing unit, a memory unit, and an input/output unit, and increases the air pressure to be higher than a recommended inflation pressure when travel speed of the vehicle is not more than a designated speed, wherein
the recommended inflation pressure is a designated air pressure set for each vehicle, and included in a range defined with an upper limit and a lower limit, and
the air pressure control device makes the air pressure to be equal to the recommended inflation pressure, and makes the air pressure of right pneumatic tires different from the air pressure of left pneumatic tires within the range when the vehicle is turning or an electronic stability control system for the vehicle is activated.

19. The traveling device according to claim 18, wherein
The upper limit is 260 kPa, and
The lower limit is 210 kPa.

20. The traveling device according to claim 18, wherein
The upper limit is 290 kPa, and
The lower limit is 230 kPa.

21. A traveling device, comprising:
pneumatic tires mounted on a vehicle;
an air pressure adjusting device that includes a control unit, and adjusts air pressure of the pneumatic tires; and
an air pressure control device that includes a processing unit, a memory unit, and an input/output unit, and increases the air pressure to be higher than a recommended inflation pressure when travel speed of the vehicle is not more than a designated speed, wherein the recommended inflation pressure is a designated air pressure set for each vehicle, and included in a range defined with an upper limit and a lower limit, and the air pressure control device makes the air pressure to be equal to the recommended inflation pressure, and makes the air pressure of front pneumatic tires different from the air pressure of rear pneumatic tires within the range when a distance between the vehicle and a vehicle that drives ahead of the vehicle is not more than a designated value.

22. The traveling device according to claim 21, wherein
The upper limit is 260 kPa, and
The lower limit is 210 kPa.

23. The traveling device according to claim 21, wherein
The upper limit is 290 kPa, and
The lower limit is 230 kPa.

24. A traveling device, comprising:

a pneumatic tire mounted on a vehicle;

an air pressure adjusting device that includes a control unit, and adjusts air pressure of the pneumatic tire; and an air pressure control device that includes a processing unit, a memory unit, and an input/output unit, and increases the air pressure to be higher than a recommended inflation pressure that is a designated air pressure set for each vehicle when travel speed of the vehicle is not more than a designated speed, wherein the air pressure control device makes the air pressure to be equal to the recommended inflation pressure when a distance between the vehicle and a vehicle that drives ahead of the vehicle is not more than a designated value, and the air pressure control device makes the air pressure to be lower than the recommended inflation pressure when braking.

* * * * *